United States Patent [19]
Cramer

[11] 3,889,499
[45] June 17, 1975

[54] AUTOMOBILE ACCELERATOR LOCKING DEVICE

[76] Inventor: William H. Cramer, 1598 N.E. 104th St., Miami Shores, Fla. 33138

[22] Filed: Nov. 1, 1974

[21] Appl. No.: 520,110

[52] U.S. Cl. .............................. 70/202; 70/379 R
[51] Int. Cl.² .......................................... B60R 25/04
[58] Field of Search........... 70/202, 203, 237, 379 R

[56] References Cited
UNITED STATES PATENTS

| | | | |
|---|---|---|---|
| 1,516,482 | 11/1924 | Gray ..................................... | 70/202 |
| 1,845,963 | 2/1932 | Ellingson ............................. | 70/217 |
| 3,631,694 | 1/1972 | Teroux................................. | 70/202 |
| 3,719,063 | 3/1973 | Fouces et al......................... | 70/202 |

FOREIGN PATENTS OR APPLICATIONS

| | | | |
|---|---|---|---|
| 1,157,115 | 5/1958 | France................................. | 70/202 |

Primary Examiner—Albert G. Craig, Jr.
Attorney, Agent, or Firm—Salvatore G. Militana

[57] ABSTRACT

An automobile accelerator locking device having an elongated tubular housing with a handle at one end and a foot member at the other end with interlocking mechanism within the housing for connecting and disconnecting the handle and foot member. The handle is key operated while the foot member is adapted to be fastened to the floor of an automobile beneath the accelerator. An accelerator locking member is secured to the housing above the foot member and is adapted to be swung to its locking position beneath the accelerator or free of the accelerator when in its unlocking position.

4 Claims, 7 Drawing Figures

3,889,499

AUTOMOBILE ACCELERATOR LOCKING DEVICE

BACKGROUND OF THE INVENTION

1. Field of the Invention

This invention relates generally to automobile anti-theft devices and is more particularly directed to a device for locking the accelerator against operation.

2. Description of the Prior Art

The conventional automobile accelerator locking devices, like the present invention require the attachment of the device to the floor, firewall dashboard or steering column and a member operatively connected to render the accelerator pedal either operable or locked so that it cannot be actuated. However, these devices are complicated in design, expensive to manufacture as well as being difficult and expensive in the installation of the device in an automobile. Most of the conventional devices have to be either installed during the manufacture of the automobile or else many variations of the design thereof have to be produced in order to accommodate the wide variety of automobiles on the present market. It is contemplated that my device will avoid all of the above indicated objections to the use of the current automobile accelerator locking devices.

SUMMARY OF THE INVENTION

Therefore, a principal object of the present invention is to provide an automobile accelerator locking device that is simple in construction and operation, inexpensive in cost and readily adaptable to being used in most of the current automobiles.

Another object of the present invention is to provide an accelerator locking device that requires no special skill or tools to install in an automobile and which is readily fastened in position within reach of the driver and requiring no changes in the structure of the automobile except for punching holes in the floor for self tapping screws and attaching a simple bracket to the dash board or the steering column.

A further object of the present invention is to provide an accelerator locking device having a handle locked and unlocked by means of a key for swinging a locking member to a position beneath the accelerator when the accelerator is to be rendered inoperable and swung to a position free of the accelerator when it is desired to operate the automobile.

A still further object of the present invention is to provide an accelerator locking device that is mountable in an automobile in such a manner as to not interfere with the other already installed operating devices, is readily operable by the use of a key only thereby making it extremely difficult to remove from its fastened postion or actuate the accelerator while my device is in its locked position.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes mor modifications mark no material departure from the salient features of the invention as expressed in the appended claims.

DESCRIPTION OF THE PREFERRED EMBODIMENT

Figure 1:
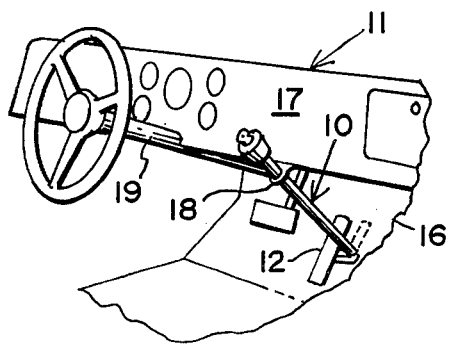
FIG. 1 is a fragmentary perspective iew of an automobile at the position of the driver's seat.
Figure 6:
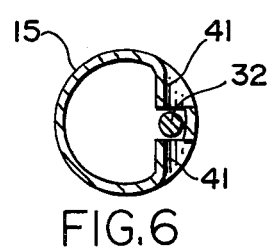
FIGS. 6 and 7 are cross sectional view taken along 6—6 and 7—7 respectively of FIG. 4.
Figure 7:
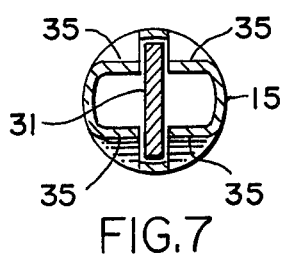
Figure 5:
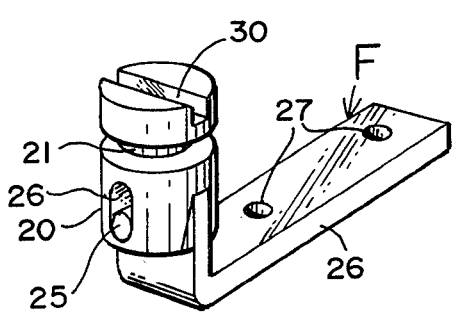
FIG. 5 is a perspective view of the base or foot assembly as seen removed from the device.

Referring to the drawings wherein like numerals are used to refer to similar parts throughout the several views, the numeral 10 refers to my accelerator locking device shown mounted in position in an automobile 11 to render the accelerator 12 inoperative. Upon actuation of the device 10 by a key 13 as is explained in detail hereinafter permits the swinging of an accelerator locking member 14 to the dotted line position as shown by FIG. 1, whereby the accelerator 12 can then be actuated to operate the motor vehicle 11.

My accelerator locking device 10 consists of a tubular housing 15 of sufficient length to extend from the floor or fire wall 16 of the automobile 11 to beyond the dashboard 17 by means of a bracket 18. The device 10 may extend and be connected to the steering column 19, if such is more convenient. The locking member 14 is secured to the lower end of the tubular member 15 extending at right angle.

Rotatably mounted within the lower end portion of the tubular member 15 is a foot assembly —F— consisting a cylindrical body member 20 having a peripheral slot 21 at the upper portion thereof. On the lower portion of the body member 20 there is an axially disposed slot 22 extending to the lower surface for receiving one leg 23 of an L-shaped foot or base member 24. The leg portion 23 is provided with a pin 25 that extends at right angle and is received by an elongated opening 26 in the cylindrical body member 20. The side wall at one side of the slot 22 extends at an obtuse angle for the purpose of permitting the tubular member 15 to be mounted at other than a right angle with the foot member 24 should such be necessary due to the manner in which the device may have to be mounted in the automobile 11. Also, in the event a thief disconnects the device 10 from the bracket 18, he will not be able to pry the foot member 24 from the floor 16 by tilting the device 10 to disconnect the foot member 24 from the fire wall 16. No force can be applied against the leg member 23 until the device 10 has been tilted some 15° to 20°. Since there is very little space at the position at which the device 10 is mounted within reach of the driver of an automobile, it is virtually impossible to tilt the device 10 beyond the aforementioned angle. The foot member 24 is provided with bores 27 for receiving bolts 28 that extend through the floor or fire wall 16 to fasten the foot member 24 securely thereto. The foot member 24 extends in the direction of and below the accelerator pedal 12 so that when the accelerator locking member 14 is in its locked position beneath the accelerator pedal 12 the locking member 14 will be positioned directly above and in alignment with the foot member 24 to prevent access to the lock bolts 28. In order to secure the rotatable cylindrical member 20 of the foot assembly —F— in the tubular member 15, detents 29 are formed by cutting and punching in opposite sides of the tubular member 15 and received by the peripheral slot 21.

On the upper portion of the cylindrical member 20 is a slot 30 that extends to the top surface thereof for receiving a key plate 31 which is suspended at the end of a pull rod 32 that extends along approximately the full length of the tubular member 15. The key plate 31 is provided with an opening 33 at its upper end for receiving a hook 34 formed at the lower end of the pull rod 32. In order to compel the key plate 31 to slide longitudinally of the tubular member 15 and not rotate so that the key plate 31 will always remain in alignment with the key slot 30, detents 35 are punched on either side of the tubular member 15 to engage each side of the key plate 31 thereby forming a slot for the key plate in which to slide along.

The key plate 31 is yielding urged in a downward direction by a coil spring 37 that engages shoulders 38 formed on the top portion of the key plate 31. The other end of the coil spring 37 engages detents 39 that have been punched on each side of the tubular member 15. In order to prevent the rotation of the pull rod 32, the latter which extends along one side of the tubular member 15 is bent to form an off-set as at 40 that extends along the other side of the tubular member 15. A plurality of pairs of detents 41 are punched on either side of the pull rod 32 to form slots 42 along which the pull rod 32 slides.

The upper end of the pull rod is formed into plurality of parallel spaced spirals 43 of helix shape which extend about the periphery of a lock shaft 44. A plurality of pins 45 extend through the lock shaft 44 and beyond the periphery thereof to engage the spirals 43 of the pull rod 32 so that upon rotation of the lock shaft 44, the pull rod 32 is made to slide longitudinally in the tubular member 15.

The upper end of the tubular member 15 is flared outwardly as at 46 to receive a conventional lock 47 which bears thereagainst. A pin 48 secures the lock 47 in position by extending through the lock 47 and openings in the end of the tubular member 15. The lock shaft 44 is directly connected to and formed as a part of the conventional lock 47.

The upper end of the tubular housing 15 is enclosed by a hollow somewhat cylindrical head or handle 49 whose upper end is curved as at 50 to engage the upper surface of the flared end portion 46 and bent inwardly as at 52,52 to permit the lower end portion 53 to engage the cylindrical housing 15 where they are fastened securely together by peening as at 54.

Figure 2:
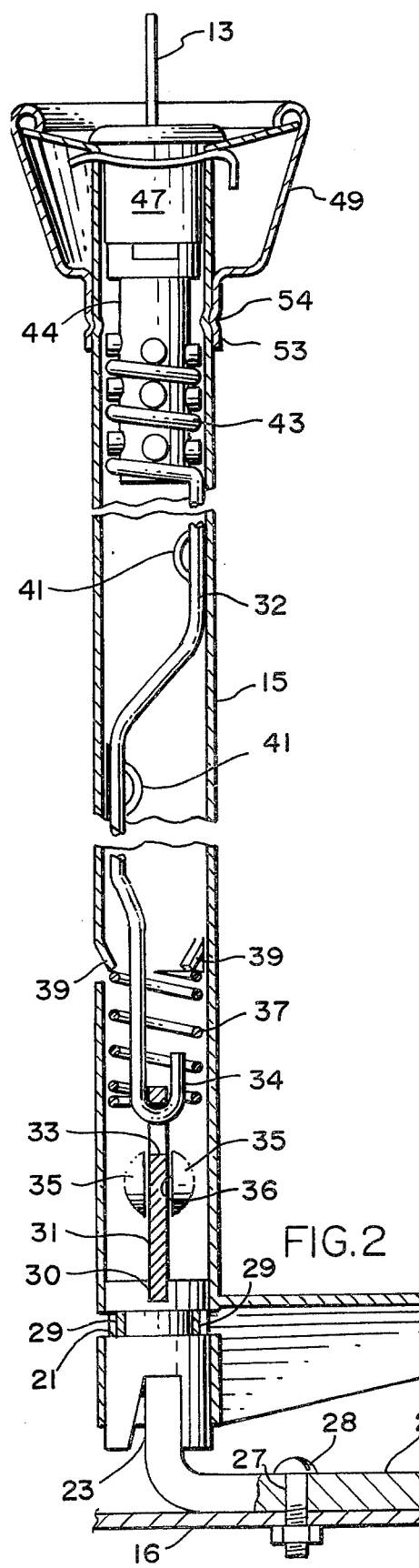
FIG. 2 is a longitudinal cross sectional view of the accelerator locking device shown in the locked position.

It can be readily noted by the above detailed description of my accelerator locking device 10, that when it is mounted and locked in position as shown by FIGS. 1 and 2 the locking member 14 will be positioned beneath the accelerator 12 and in contact therewith to prevent the accelerator 12 from being actuated. In this locked position the pull rod 32 will have been forced by the coil spring 37 to slide downwardly and the key plate 31 will have engaged and be received by the key slot 30 of the foot assembly —F—. The handle 49 is consequently locked against rotation.

In order to release the accelerator locking device 10 so as to permit the locking member 14 to be swung out from beneath the accelerator 12, the key 13 is inserted to release the lock mechanism of the conventional lock 47 and when rotated in the lock 47, the lock shaft 44 will rotate withdrawing the pull rod 32 upwardly carrying with it the key plate 31 which now leaves the key slot 30. This movement releases the housing 15 from engagement with the fixed foot assembly —F—. Now upon turning the handle 49, the locking member 14 will rotate simultaneously therewith and will swing from beneath the accelerator 12 to the dotted line position as shown by FIG. 1. The accelerator can now be actuated in the normal manner to propel the automobile 11.

Figure 4:
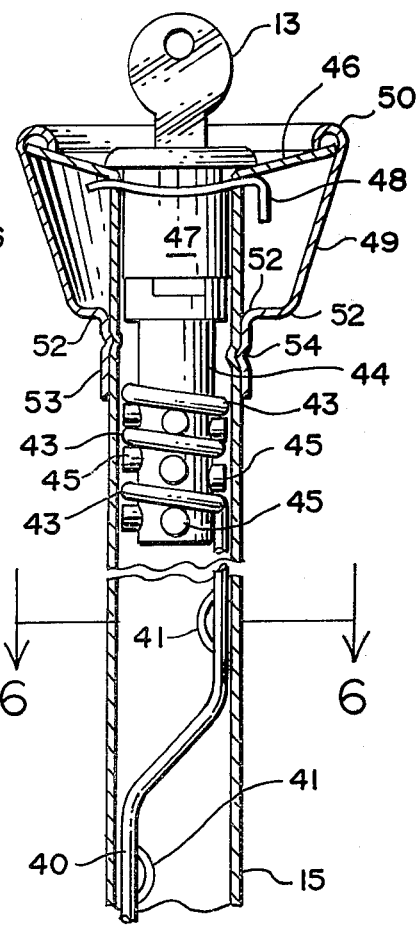
FIG. 4 is a view similar to FIG. 3 showing the device in its unlocked position prior to the key plate being urged into a locked position.
Figure 4:
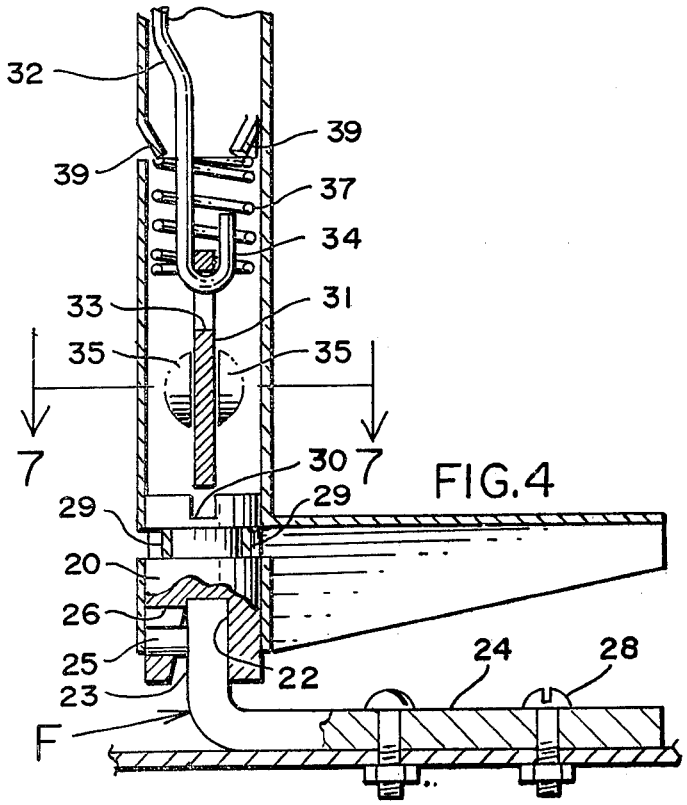
Figure 3:
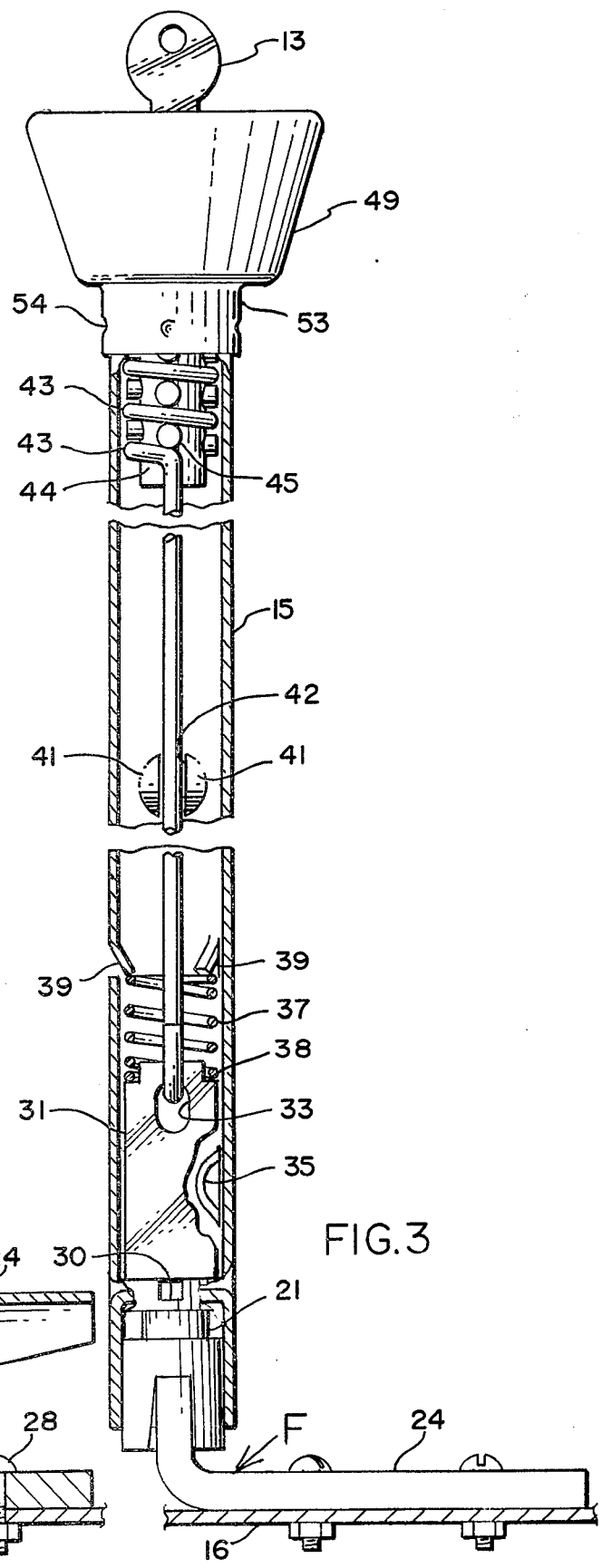
FIG. 3 is a similar view showing the device as seen when rotated about its axis approximately 90° and in an unlocked position.

To lock the accelerator 12 against use, all that need be cone, rotate the handle 49 to swing the locking member 14 from the dotted line position as shown by FIG. 1 to the position beneath the accelerator 12. Upon rotating the key to its locked position, the lock shaft 44 will now rotate from the position shown by FIGS. 3 and 4 to that shown by FIG. 2 whereby the pull rod 32 is made to slide downwardly. The coil spring 37 will now cause the key plate 31 to slide downwardly until it becomes seated in the key slot 30. The key 13 can then be removed and the handle 49 cannot now be rotated to swing the locking member 14 from beneath the accelerator 12. Normally, when a person is desirous of using his automobile, he will unlock his device 10 by means of the key 13 and then rotate the handle to swing the locking member 14 away from beneath the accelerator 12. Then he can use the key 13 to place the locking mechanism 32, 37 and 31 into its locked position wherein the key plate 31 will engage the top surface of the cylinder 20. However, the slot 30 of the cylinder 20 will be at right angle and out of alignment with the key plate 31. When the person desires to lock the device 10, all he need do is to rotate the handle 49 which will cause the locking member 14 to swing to its locking position beneath the accelerator 12 at which position the slot 30 will now become aligned with the key plate 31, and thereby become engaged to lock the device 10 and render the accelerator 12 inoperable.

What I claim as new is and desire to secure by Letters Patent of the United States is:

1. An automobile accelerator locking device comprising a tubular member, a foot member rotatably mounted at one end of said tubular member and adapted to be fastened to the floor of an automobile beneath the accelerator, an accelerator locking member secured to said one end of said tubular member adjacent said foot member, handle means mounted at the other end of said tubular member, a key operated lock device mounted at said other end of said tubular member and interconnecting means extending between said lock device and said foot member whereby upon swinging said locking member to a position beneath the accelerator and locking said lock device said interconnecting means is actuated to connect said handle means and said foot member to prevent the operation of said accelerator.

2. The structure as recited by claim 1 wherein said foot member comprises a cylindrical member positioned within said tubular member, said cylindrical member having a peripheral slot, detent means mounted on said tubular member received by said peripheral slot permitting the rotational movement of said cylindrical member and a substantially L-shaped member secured at one end to said cylindrical member and extending beyond the end of said tubular member and at substantially right angle to said tubular member.

3. The structure as recited by claim 2 wherein said inter-connecting means comprises a rod, a key plate secured to said rod at said one end of said tubular member adjacent said cylindrical member, detent means mounted on said tubular member permitting the longitudinal sliding movement of said key plate, said cylindrical member having a further slot on the upper surface thereof for receiving said key plate and spring means yieldingly urging said key plate in the direction of said cylindrical member whereby upon the actuation of said lock device, said rod is compelled to slide in the direction of said one end of said tubular member and said key plate is received by said further slot and means securing said foot member to the floor of said automobile whereby said locking member and said foot member are positioned beneath said accelerator and secured against rotational movement.

4. The structure as recited by claim 3 wherein said cylindrical member having a radially disposed slot receiving said one end of said L-shaped member, one of the walls of said slot extending at an obtuse angle, a pin secured to said one end of said L-shaped member and received by an elongated slot in said cylindrical member permitting relative movement between said L-shaped member and said cylindrical member.

* * * * *